Dec. 20, 1927.
J. A. STEVENS
1,653,317
SHOCK ABSORBER
Filed Aug. 13, 1925
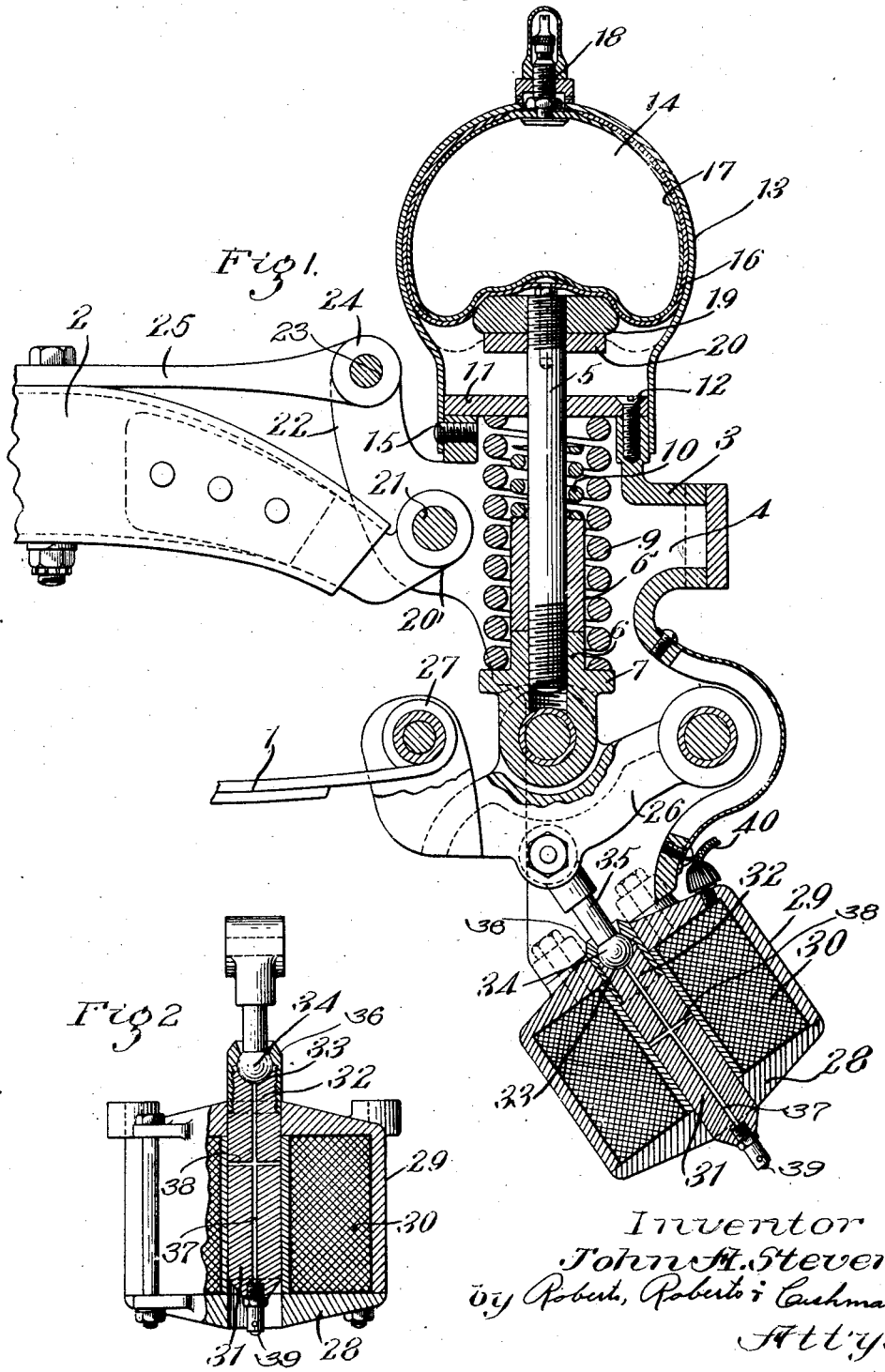
Inventor
John A. Stevens
by Roberts, Roberts & Cushman
Att'ys.

Patented Dec. 20, 1927.

1,653,317

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed August 13, 1925. Serial No. 50,023.

This invention relates to an improvement in shock absorbers for use in addition to and in conjunction with the usual body spring of a vehicle or adapted to be used on any appliance or mechanism having parts movable relative to each other as a snubbing or dampening apparatus. The tendency for an automobile to sway, oscillate, teeter and jackrabbit with an undulating movement when traveling at higher rates of speed is well recognized and is due to the fact that even the best macadam or concrete roads contain ripples that accentuate this undulating tendency. This constant rising and falling movement that an occupant of a vehicle experiences occurs without jar or jolt when effective shock absorbers are used but is nevertheless annoying and oftentimes produces an illness similar to seasickness. While shock absorbers have to a great degree solved the problem of counteracting and neutralizing the shocks received by the vehicle so that the same are transmitted to the occupants thereof with a slight jar and diminished force, the inability of known shock absorbers to effectively damp the undulating tendency of the springs and body of the vehicle and return same to the normal position of equilibrium is an outstanding defect.

Objects of this invention are to provide a shock absorber that will readily neutralize the shocks received by the vehicle on which said shock absorber is mounted and quickly equilibrize the forces acting on the springs and body of the vehicle; to provide a shock absorber adapted to effectively absorb shocks and bring the forces acting on the springs and body of the vehicle into equilibrium without affecting the resiliency of the springs and ability of the device to neutralize shocks; to arrange a plunger electro-magnet in a shock absorbing device, snubber or dampener so that the normal position of the chassis of the vehicle relative to the springs and wheels under a normal load is effectively maintained by the action of said electro-magnet; and to provide a device so simple in its construction that the same can be easily applied to an automobile or other vehicle without changing its parts.

Other objects of the invention will be apparent from the detailed description and appended claims hereinafter set forth. For purposes of illustration the invention is shown in the accompanying drawings, in which:

Fig. 1 is a vertical section of the shock absorbing device showing the same connected to the spring and body of a vehicle; and Fig. 2 is a side elevation partly in section of a plunger electro-magnet snubber or dampener forming a part of the shock absorber.

As is illustrated the numeral 1 designates the usual semi-elliptic leaf spring mounted on the axle of a vehicle and adapted to support the usual chassis or frame 2. In accordance with this invention a shock absorbing device, designated as a whole by the numeral 3, is inserted between one end of the leaf spring 1 and the body or frame 2.

The shock absorber 3 comprises a body portion 4 adapted to enclose a piston rod 5 screw-threaded on each end. A sleeve 6 having interior threads engaging the lower threaded end of the rod 5 has on its exterior surface a shoulder 7 forming a seat for the coiled spring 9, surrounding the piston rod 5 and mounted between said shoulder and a washer 11 which is rigidly attached to the upper end of the body portion 4 through the medium of the screws 12. A sleeve 6' also surrounds the piston rod 5 and rests on the upper end of the sleeve 6 providing a seat for a small coiled spring 10, hereafter referred to as a check spring, located between said sleeve 6' and the washer 11 and within the coiled spring 9. Surrounding the upper end of the body portion 4 and enclosing the washer 11 is a spherical casing or cylinder 13 forming a compression chamber 14. The lower end of the cylinder is rigidly attached to the upper peripheral end of the body portion 4 through a series of screws 15.

Enclosed within the cylinder 13 is an outer casing of fabric 16 containing an inner casing 17 of rubber. The casing 17 is adapted to be inflated through a valve 18 attached to the casing and extending through the top of the cylinder 13. The valve 18 may be the type of valve commonly employed for inflating pneumatic casings. The upper end of the piston rod 5 extends through an opening in the washer 11 into the cylinder member 13 and carries a piston 19 with a washer 20 located between the lower end of the piston and a shoulder on said rod. The piston 19 bears against the lower side of the casing 16 and as is obvious will further compress the air in the compression chamber 14 on its upward movement. An eye member 20′ is suitably mounted on the end of the frame or body 2 of the vehicle and is pivotally attached to a spindle 21 mounted on the inner end of an arm 22 extending from the body portion 4. The arm 22 at its upper end carries a bolt 23 receiving the eye 24 of a projection 25 also mounted on the frame or body 2 so that free movement is permitted between the frame or body of the vehicle and the shock absorbing element.

An arm 26 is pivotally mounted intermediate its end, on the lower end of the sleeve 26. One end of the arm 6 is further pivoted to a portion of the body 4 while the other end of said arm pivotally receives the eye 27 of the leaf spring 1 permitting free movement between said spring and the shock absorbing element.

The parts above described function to effectively counteract and neutralize the shocks received by the vehicle so that said shocks are very lightly transmitted to the occupants of same. However, the aforesaid parts alone do not overcome the tendency of the chassis or frame of the vehicle to assume an undulating movement. In fact the pneumatic cushion and auxiliary springs rather tend to increase the undulation of the vehicle and for that reason the plunger electro-magnet hereinafter described peculiarly cooperates with the shock absorber previously described to produce a structure in its entirety which has all of the benefits of the pneumatic shock absorber and overcomes all of its defects.

The electro-magnet 28 is pivotally mounted on the arm 26 directly below the point where said arm is pivotally attached to the lower end of the sleeve 6. The electro-magnet comprises a body portion 29 containing a solenoid 30 insulated from and in surrounding relation to a plunger 31 which is magnetized by the electric current passing through said solenoid. The plunger 31 has an upper reduced threaded portion 32 which is formed with a concave seat 33 at its outer end to receive a spherical end portion 34 of the pin 35 which is pivotally attached at its opposite end to the arm 26. The pin 35 is attached to the plunger 31 by means of the retaining nut 36 threadedly engaging the reduced threaded portion 32 of said plunger. The plunger 31 has a longitudinal groove 37 and lateral grooves 38 adapted to receive oil from an oiling device 39 located on its inner end. Current is conveyed to the solenoid 30 through a suitable lead wire 40 from some convenient source such as the usual generator or battery on the car or a special generator or battery provided for the purpose.

The operation of the device is as follows: When a shock is transmitted to the spring 1 the force of said shock is not directly carried to the frame 2 but causes the piston 19 to rise upwardly against the pressure of the compressed air in the compression chamber 14 so that the shock is counteracted and neutralized and very slightly conveyed to the occupants of the vehicle as is well known and understood. A check spring is also used for a superimposed load when the devices are used on or within any structures—that is, it is used for a check spring and for providing additional spring carrying capacity to take care of extra loading of the structures to which the device is attached. The check springs thus perform the double function of a check spring to absorb extreme shocks and a resistance for extra loading of any automobile, vehicle or structure on which the devices are used. The electro-magnet 29 not only serves to impede and soften the shock transmitted to the frame 2, but when the forces acting on the vehicle are such as to tend to cause the piston 19 to continually oscillate in the cylinder 13 and thus give an undulating movement to the frame 2 that tendency will be quickly overcome by reason of the electro-magnet acting as a drag on the movement of the piston and thus causing a balancing of the forces acting on the piston and establishing complete equilibrium.

The plunger electro-magnet as shown in Fig. 1 is normally positioned with respect to the normal relative position of the springs and chassis so that said plunger exerts its maximum retarding force in this position. The plunger electro-magnet when displaced from its normal position, shown in Fig. 1, by the functioning of the shock absorbing device in neutralizing shocks, constantly drags on said device and tends to assume its normal position with the result that any undulating movement of springs and chassis is quickly damped by the action of said electro-magnet.

The initial reaction of the piston of the shock absorbing element to a shock results in a relative long stroke of said piston and consequently of the electro-magnet plunger which is attached thereto. The longer and slower strokes of the piston and movable elements of the shock absorbing device are immediately followed by shorter and faster strokes until the elements are rapidly oscillating. This is the normal reaction of the shock absorbing device to a single shock provided no other forces are acting on said device. It frequently happens, however, that after the force of a severe shock has set the movable elements of the device in motion the ripples on the surface of the roadway will furnish sufficient impetus to the movable elements of the shock absorber to sustain them in their initial movements with the result that the body of the vehicle assumes the rapid undulating movement previously described. The electro-magnet serves not only to check the rapidly oscillating tendency which normally follows a shock but also overcomes the undulating movement of the vehicle. When the plunger of the electro-magnet rapidly oscillates eddy currents are set up in the magnet plunger with the result that the attraction between the solenoid and plunger is increased and the damping action of the plunger is intensified.

The plunger electro-magnet is arranged and adjusted with respect to the relative position of the springs and chassis under normal load so as to exercise its maximum retarding effect in that position.

While the plunger electro-magnet, snubber or dampener is shown and described as in connection with a vehicle, it is not limited thereto but may be embodied in any device, having parts movable relative to each other to dampen and retard the movement of said parts.

I claim:

1. A shock absorber, adapted to be mounted on the usual frame and springs of a vehicle, comprising a compression chamber containing compressed air mounted on the frame of said vehicle, a piston carried by the springs of said vehicle adapted to oscillate in said chamber, additional means adapted to retard the movement of said piston and further means acting as a drag on said piston quickly to arrest the relative movement of said piston and chamber.

2. A shock absorber, adapted to be mounted on the usual frame and springs of a vehicle, comprising a compression chamber containing compressed air, a piston adapted to oscillate in said chamber, additional means adapted to retard the movement of said piston and further means acting as a drag on said piston quickly to arrest the relative movement of said piston and chamber.

3. A shock absorber, adapted to be mounted on the usual frame and springs of a vehicle, comprising a compression chamber containing compressed air, a piston adapted to oscillate in said chamber, mechanical means adapted to retard the movement of said piston and a solenoid acting as a drag on said piston quickly to arrest the relative movement of said piston and chamber.

4. A shock absorber, adapted to be mounted on the usual frame and springs of a vehicle, comprising a compression chamber containing compressed air mounted on the frame of said vehicle, a piston carried by the springs of said vehicle adapted to oscillate in said chamber, means on the piston adapted to retard such oscillation and further means attached to said piston and adapted to act as a drag quickly to arrest the relative movement of said piston and chamber.

5. A shock absorber, adapted to be mounted on the usual frame and springs of a vehicle, comprising a compression chamber containing compressed air mounted on the frame of said vehicle, a piston having a piston rod carried by the springs of said vehicle and adapted to oscillate in said chamber, a coil spring surrounding the piston rod and adapted to be compressed on the upward movement of the piston, and means acting as a drag on said piston quickly to arrest the relative movement of said piston and chamber.

6. A shock absorber for vehicles comprising a casing having a chamber therein, a closed collapsible inner casing filled with a compressible fluid under pressure within said chamber, a piston having a piston rod arranged to compress said inner casing, a relatively large coil spring surrounding the piston rod and adapted to be compressed on the upward movement of the piston, a relatively small coil spring surrounding the piston rod and contained within the large coil spring, and means acting as a drag on said piston quickly to arrest the relative movement of said piston and chamber.

7. A shock absorber, adapted to be mounted on a vehicle, comprising at least two separate and distinct means for neutralizing and counteracting the shock received by said vehicle and an electro-magnet so arranged as quickly to arrest the forces set in motion by said shock to bring them into a state of equilibrium.

8. A shock absorber, adapted to be mounted on a vehicle, comprising a compression chamber, a piston adapted to oscillate in said chamber, compressible members attached to said piston apart from the compression chamber and an electro-magnet arranged to act as a drag on said piston quickly to arrest the relative movement of said piston and chamber.

9. A shock absorber for vehicles comprising a compression chamber containing compressed air mounted on the body of said vehicle, a piston adapted to oscillate in said chamber mounted on the springs of said vehicle and a plunger electro-magnet normally positioned with respect to the normal relative position of the body and springs so that said plunger acts as a maximum drag on said piston when in its normal position and being displaced therefrom positively tends to recover the normal position of body springs and plunger.

10. A shock absorber, adapted to be mounted on the usual chassis and springs of a vehicle, comprising at least two separate and distinct means responsive to the relative movement between the chassis and springs for neutralizing and counteracting a shock received by said vehicle and additional means normally positioned with respect to the normal relative position of the body and springs adapted to return said body and springs to normal position after being displaced therefrom.

11. A shock absorber adapted to be mounted on the usual chassis and springs of a vehicle comprising means responsive to the relative movement between the chassis and springs for neutralizing and counteracting a shock received by said vehicle and means positioned with respect to the normal relative position of the body and springs under normal load to exercise a maximum retarding effect on relative movement of the chassis and springs in that position.

12. A shock absorber, adapted to be mounted on a vehicle, comprising at least two separate and distinct means for neutralizing and counteracting the shock received by said vehicle and an electro-magnet snubber adapted, by opposed electric currents in action through a solenoid, quickly to arrest the forces set in motion by said shock to bring them into a state of equilibrium.

13. A shock absorber, adapted to be mounted on the usual chassis and springs of a vehicle, comprising means responsive to the relative movement between the chassis and springs for neutralizing and counteracting a shock received by said vehicle and means, providing electrical forces opposing the relative movement of the chassis and springs, positioned with respect to the normal relative position of the body and springs under normal load to exercise a maximum retarding effect on relative movement of the chassis and springs in that position.

14. In a device of the character described comprising a member adapted to be set in motion in response to a shock and move relative to another member connected therewith, means providing electrical forces acting against the movement of said members to retard or stop relative movement therebetween, the dampening effect of the electrical forces tending to retard and stop relative movement of said members being greatest in the normal position of said members.

15. A snubber or dampener of the class described adapted to be positioned with respect to the normal position of two members movable relative to each other and providing electrical yielding means retarding the said relative movement of the members and adapted to exercise a maximum retarding effect on said members when in normal position.

16. A snubber or dampener of the class described adapted to be positioned with respect to the normal position of relatively movable members and providing electrical forces which are greatest in the normal position acting in opposition to the movement of said members and adapted to bring them into a state of equilibrium.

17. A device for taking up shock caused by sudden relative movements of two members, comprising a casing having a chamber therein, a closed collapsible inner casing filled with a compressible fluid under pressure within the chamber, said inner casing being fixed to one of said members, a piston having a piston rod carried by the other of said members and adapted to oscillate in said chamber, a coil spring surrounding said piston rod and adapted to be compressed on the movement of said piston in one direction and means acting as a drag on said piston quickly to arrest the relative movement of said members.

18. A device for taking up shock caused by sudden relative movements of two members comprising a casing having a chamber therein, a closed collapsible rubber casing within said chamber having a compressible fluid under pressure therein, said rubber casing being connected to one of said members, a piston having a piston rod carried by the other of said members and adapted to oscillate in said chamber, a relatively large coil spring surrounding the piston rod and adapted to be compressed on the movement of the piston in one direction, a relatively small coil spring surrounding the piston rod and contained within the large coil spring, and means acting as a drag on said piston quickly to arrest the relative movements of said members.

19. A shock absorbing device for cushioning the shock caused by a quick relative movement of two members, comprising a casing fixed to one of said members having a chambered portion therein, a flexible diaphragm separating the chambered portion from the remainder of the casing, the chambered portion being filled with a compressible fluid, a rocker arm journaled near one of its ends to said casing, the other of said members being connected to said rocker arm so as to rock it on a relative movement of said members, a piston pivoted to said rocker arm having a head bearing against said diaphragm, an abutment fixed to said casing, a spring surrounding said piston and bearing at one end against said abutment and at the other end against an abutment on said piston and a second spring acting in parallel with the first mentioned spring to absorb only extremely heavy shocks and to assist in bearing only an extremely heavy load.

20. In a shock absorber, a casing, a lever pivoted thereto, an air cushion in said casing, a piston pivoted to said lever, two springs adapted to be compressed in parallel by said piston on movement of said lever, said piston also bearing against said air cushion, the springs being so arranged that one is compressed to a predetermined degree before the other is brought into action.

21. In a shock absorber, a casing, a lever pivoted thereto, an air cushion in said casing, a piston pivoted to said lever, two concentric springs surrounding the piston rod and bearing against abutments thereon, the springs adapted to work in parallel and arranged so that one is brought into action before the other, said piston also acting against said air cushion.

22. In a shock absorber, a casing, a lever pivoted thereto, an air cushion in said casing, a piston pivoted to said lever, two concentric springs surrounding the piston rod and bearing against abutments thereon, the springs adapted to work in parallel and arranged so that one is compressed by a relatively slight shock but both are compressed by a relatively heavy shock, said piston also bearing against said air cushion.

Signed by me at Lowell, Massachusetts, this 12 day of August, 1925.

JOHN A. STEVENS.